(12) United States Patent
Capet et al.

(10) Patent No.: US 11,372,074 B2
(45) Date of Patent: Jun. 28, 2022

(54) POSITIONING SYSTEM

(71) Applicant: CENTRE NATIONAL D'ETUDES SPATIALES, Paris (FR)

(72) Inventors: Nicolas Capet, Toulouse (FR); François-Xavier Marmet, Muret (FR)

(73) Assignee: CENTRE NATIONAL D'ETUDES SPATIALES (CNES), Paris (FR)

( * ) Notice: Subject to any disclaimer, the term of this patent is extended or adjusted under 35 U.S.C. 154(b) by 51 days.

(21) Appl. No.: 16/962,185

(22) PCT Filed: Jan. 21, 2019

(86) PCT No.: PCT/EP2019/051393
§ 371 (c)(1),
(2) Date: Jul. 14, 2020

(87) PCT Pub. No.: WO2019/141849
PCT Pub. Date: Jul. 25, 2019

(65) Prior Publication Data
US 2021/0055368 A1 Feb. 25, 2021

(30) Foreign Application Priority Data
Jan. 19, 2018 (EP) .................................... 18305046

(51) Int. Cl.
*G01S 5/00* (2006.01)
*G01S 5/02* (2010.01)
(Continued)

(52) U.S. Cl.
CPC .......... *G01S 5/0009* (2013.01); *G01S 5/0252* (2013.01); *G01S 5/08* (2013.01); *G01S 5/10* (2013.01);
(Continued)

(58) Field of Classification Search
CPC ........ G01S 5/0009; G01S 5/0252; G01S 5/08; G01S 5/10; G01S 5/12; G01S 5/14;
(Continued)

(56) References Cited

U.S. PATENT DOCUMENTS

2015/0111597 A1* 4/2015 Lavery ................... H04W 4/33
455/456.1
2016/0219549 A1 7/2016 Wong et al.
(Continued)

OTHER PUBLICATIONS

Oota et al., High-Accuracy Positioning Using Phase Difference of Electrode Array for Two-Dimensional Communication Sensor Network (2DCSN), 2011, IEEE.*
(Continued)

*Primary Examiner* — Omar Casillashernandez
(74) *Attorney, Agent, or Firm* — Burris Law, PLLC

(57) ABSTRACT

There is disclosed a system for locating an object on a surface waveguide. The surface waveguide is made of one or more 1D wires and/or 2D waveguides comprising conductive elements arranged in patterns. Emitters with known positions can couple with receivers coupled with the surface waveguide. The position of receivers can be determined, for example by multilateration or signal strength indication. Conductive elements can be sprayed or sewed or otherwise deposited onto surfaces such as a ground floor, a sidewalk or a road lane. Described developments comprise the use of absorbers, protective layers, unidirectional emitters, contactless coupling, and various arrangements comprising frequency-selective layers, arrangements in lattices, trellis or anisotropic surfaces. Signal processing aspects and software embodiments are also described.

17 Claims, 4 Drawing Sheets

(51) Int. Cl.
  *G01S 5/08* (2006.01)
  *G01S 5/10* (2006.01)
  *G01S 5/12* (2006.01)
  *G01S 5/14* (2006.01)
  *G01S 5/16* (2006.01)

(52) U.S. Cl.
  CPC ................. *G01S 5/12* (2013.01); *G01S 5/14* (2013.01); *G01S 5/16* (2013.01)

(58) Field of Classification Search
  CPC ........ G01S 5/16; G01S 5/0226; G01S 5/0289; G01S 5/0294
  USPC .......................................................... 340/8.1
  See application file for complete search history.

(56) References Cited

U.S. PATENT DOCUMENTS

| | | | |
|---|---|---|---|
| 2016/0282442 A1* | 9/2016 | O'Mahony | G01S 5/0036 |
| 2017/0184387 A1 | 6/2017 | Lefevre et al. | |
| 2017/0248696 A1* | 8/2017 | Vyssotski | A61B 5/1113 |
| 2018/0233145 A1* | 8/2018 | Bathiche | G06K 9/00369 |
| 2021/0283513 A1* | 9/2021 | Wildhaber | A63F 13/837 |

OTHER PUBLICATIONS

Oota, et al., "High-accuracy positioning using phase difference of electrode array for two-dimensional communication sensor network (2DCSN)", Sensors, 2011 IEEE, pp. 786-789, Oct. 28, 2011.

Sievenpiper, et al., "Eliminating surface currents with metallodielectric photonic crystals", 1998 IEEE MTT-S International Microwave Symposium Digest, 1998.

Lee, et al., "Patterning Technique for Generating Arbitrary Anisotropic Impedance Surfaces", IEEE Transactions on Antennas and Propagation, vol. 64, Issue: 11, pp. 4725-4732, Nov. 2016.

\* cited by examiner

POSITIONING SYSTEM

CROSS-REFERENCE TO RELATED APPLICATIONS

This application is a National Stage of International patent application PCT/EP2019/051393, filed on Jan. 21, 2019, which claims priority to foreign European patent application No. EP 18305046.7, filed on Jan. 19, 2018, the disclosures of which are incorporated by reference in their entirety.

TECHNICAL FIELD

This document relates to the field of digital data processing and more particularly to positioning methods and systems.

BACKGROUND

Locating objects or people precisely in space can be a challenging task. Indoor positioning in particular can be difficult, as broadcast signals from Global Navigation Satellite System (GNSS) satellites generally are not available inside a building.

Existing approaches present limitations. For example, patent application US20160219549 entitled "SYSTEMS, METHODS AND DEVICES FOR INDOOR POSITIONING USING WIFI" handles time delay in propagation of one or more Wi-Fi signals to determine a position. Such an approach can present insufficient accuracy and reliability for particular uses (such as the detection of a body falling on the floor in a hospital or in a secure area, or the detection of the abnormal presence of liquid on the floor). Such approaches generally imply latencies or delays before detection.

Existing approaches hardly can be rendered suitable both for indoor and/or outdoor applications, requiring precision, speed and reliability.

There is consequently a need for advanced methods and systems for indoor and/or outdoor positioning.

SUMMARY

Here is disclosed a system for locating an object on a surface waveguide. The surface waveguide is made of one or more 1D wires and/or 2D waveguides comprising conductive elements arranged in patterns. Emitters (or receivers) with known positions can communicate with receivers (or emitters) coupled with the surface waveguide. The position of receivers (or emitter) can be determined, for example by multilateration or signal strength indication. Conductive elements can be sprayed or sewed or otherwise deposited onto surfaces such as a ground floor, a sidewalk or a road lane. Described developments comprise the use of absorbers, protective layers, unidirectional emitters, contactless coupling, and various arrangements comprising frequency-selective layers, arrangements in lattices, treillis or anisotropic surfaces. Signal processing aspects and software embodiments are also described.

Advantageous embodiments of the invention comprise, but are not limited to the precise positioning of objects (articles of manufactures, e.g. cars on a road or small objects found on a desk) or animals or people, in indoor or outdoor environments such as buildings, schools, commercial centers, hospitals, sidewalks, road lanes, airport landing lanes, or football fields.

BRIEF DESCRIPTION OF DRAWINGS

Embodiments of the present invention will now be described by way of examples with reference to the accompanying drawings in which like references denote similar elements, and in which.

DETAILED DESCRIPTION

Figure 1:
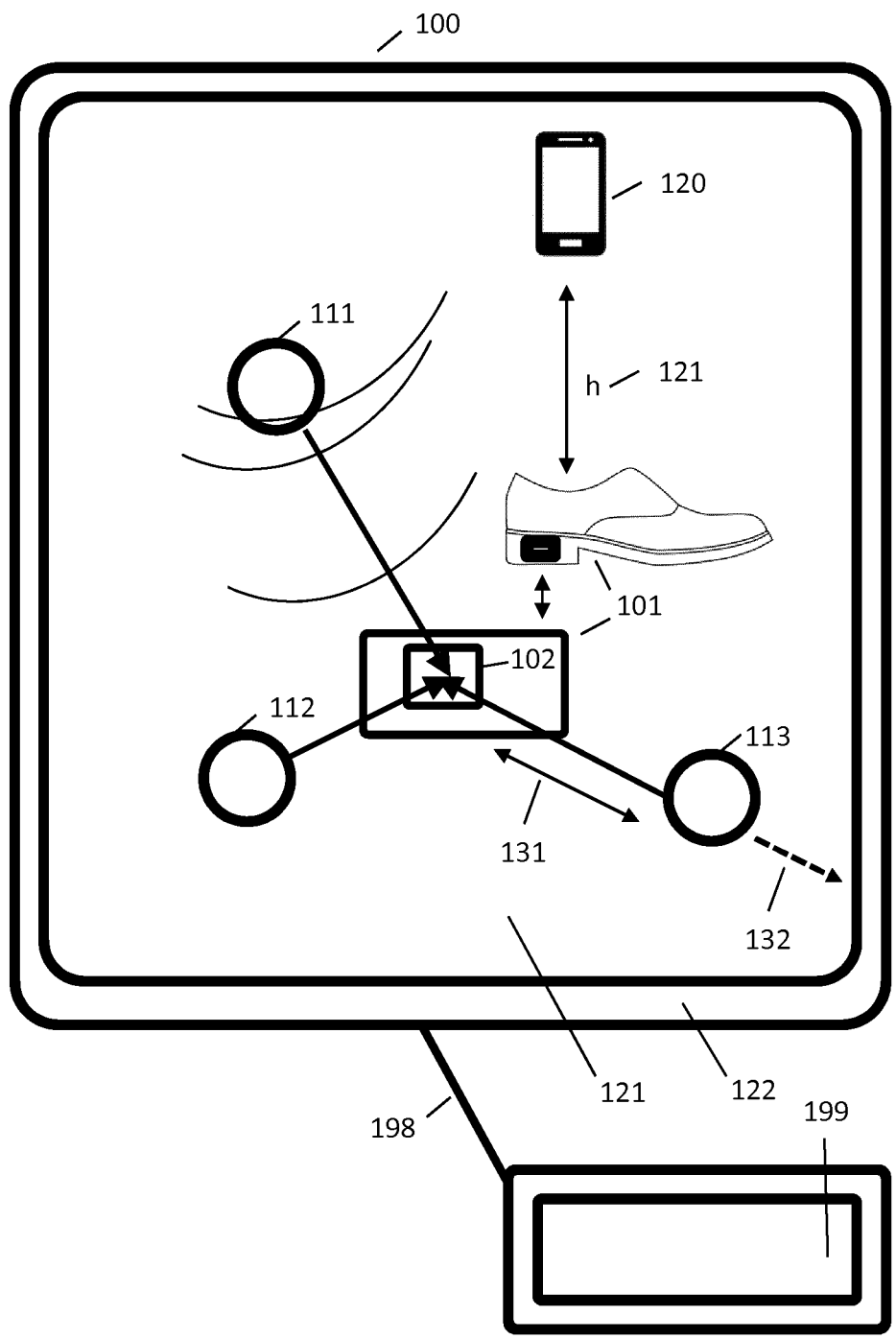
FIG. 1 shows an embodiment of the invention.

Definitions of terms are provided below.

A "position" or "location" designates the coordinates in space of an object/receiver. Positions can be tracked or monitored over time.

A "coordinate system" is a system which uses one or more numbers, or coordinates, to uniquely determine the position of a point or other geometric element in a space such as Euclidean space. Coordinates can use an ordered tuple. Different coordinate systems can be used, comprising and not limited to number lines, Cartesian coordinate system, polar coordinate system, cylindrical and spherical coordinate systems, homogeneous coordinate system, curvilinear coordinates, orthogonal coordinates, skew coordinates, log-polar coordinate system, barycentric coordinates, trilinear coordinates, etc.

A "surface" can designate a supporting surface in any structure (for example the ground floor in a train). The term "surface" can designate that part of a room, hallway, or the like, that forms its lower enclosing surface and upon which one walks. The term also can designate a supporting surface extending horizontally throughout a building, having a number of rooms, apartments, or the like, and constituting one level or stage in the structure. In particular, while the singular is used, a plurality of interconnected surfaces can be used (bridges providing electrical coupling may be created via/through walls or ceilings).

The "surface" according to the invention can be one or more of a floor, ground, indoor ground surface, bottom, area, mat, carpet, parquet, pavement, basement, canvas, carpet, deck, flooring, rug, stage, boards, cellar, flat, etc.

The "surface" can comprise flat and/or non-flat portions or partitions. In other words, the surface according to the invention is not necessarily entirely flat. It can be horizontal, vertical (wall), angled, inclined, planar, curved, bent, twisted, bumped, embossed, or the like.

A "waveguide" designates a structure that guides waves, such as electromagnetic waves, with minimal loss of energy by restricting expansion to one dimension or two. A waveguide can be a hollow conductive metal pipe used to carry high frequency radio waves. The geometry of a waveguide can vary. A 1D (one-dimension) waveguide confines energy in one dimension, fiber or channel. The frequency of the transmitted wave also can dictate the geometry and shape of a waveguide. For a 1D waveguide, the width of a waveguide is generally of the same order of magnitude as the wavelength of the guided wave. Depending on the frequency, a waveguide can be constructed from conductive and/or dielectric materials. Waveguides may be used for transferring both power/energy and communication signals.

The invention is related to a "surface waveguide" (it exploits "surface waveguide" properties). Surface waves (waves propagating in/on a conductive surface) generally cannot couple to external plane waves. At optical frequencies, prism coupling can be used. A prism can be placed next to the surface, and the refractive index of the prism can be used to match the wave vector of a probe beam to that of a surface wave. At microwave frequencies, a small probe can be used. A point source can launch all wave vectors and a small antenna placed near the surface is capable of coupling to surface-wave modes (in addition, the antenna geometry can be tailored to distinguish polarization). In TM (transverse-magnetic) surface waves, the electric field forms loops that extend vertically out of the surface. TM waves can be measured using a pair of small monopole antennas oriented normally with respect to the surface. The vertical electric field of the probe couples to the vertical electric field of the TM surface waves. In TE (transverse-electric) surface waves, the electric field is parallel to the surface. It can be measured with a pair of monopole probes oriented parallel to the surface. The horizontal electric field of the antenna couples to the horizontal electric field of the TE waves. On a flat metal sheet, TE waves' measurement produces no significant signal because any antenna that excites TE waves is shorted out on a conducting surface.

It is only on a specific textured surface, with its unusual surface impedance, that significant TE transmission signal levels can be obtained. Embodiments of the invention describe several types of specific surface waveguides, and the use thereof for indoor positioning.

A pattern or template is a discernible regularity e.g. a repetitive arrangement. Elements of a pattern repeat in a predictable manner. A geometric pattern is a kind of pattern formed of geometric shapes and typically repeating like wallpaper. Patterns include spirals, meanders, waves, foams, tilings, cracks, and those created by symmetries of rotation and reflection. Patterns can have an underlying mathematical structure. Visual motifs can be combined and repeated to form patterns.

A lattice designates an ornamental criss-crossed framework, an arrangement of crossing laths or other thin strips of material. A lattice graph, mesh graph, or grid graph, is a graph whose drawing forms a regular tiling. Latticework is an openwork framework consisting of a criss-crossed pattern of strips of building material. The design is created by crossing the strips to form a network. Latticework can be used as a truss structure such as a lattice girder bridge. A lattice girder is a girder where the flanges are connected by a lattice web. A lattice corresponds to a symmetry group of discrete translational symmetry in n directions.

A trellis (treillage) is an architectural structure, usually made from an open framework or lattice of interwoven or intersecting pieces of materials. Trellis can also be referred to as panels, usually made from interwoven pieces, for example attached to fences or the roof or exterior walls of a building.

In engineering, a truss is a structure that "consists of two-force members only, where the members are organized so that the assemblage as a whole behaves as a single object". A "two-force member" is a structural component where force is applied to only two points.

Here is disclosed a system for locating an object on a surface waveguide comprising: one, two or three or more (depending on embodiments) signal emitters with known positions associated with said surface (for example embedded therein); the object being associated with a receiver configured to determine its position from processing the signal received from said signal emitters through one or more waveguides embedded in the surface waveguide.

In some embodiments (e.g. one emitter, plurality of receivers), the words "emitter" and "receivers" can be permuted.

The surface can designate a "surface-wave waveguide". A plurality of configurations of such a surface are described herein.

Signal emitters are connected to the surface, acting as a 2D waveguide. In some embodiments, signal emitters can be embedded in the surface. The term "embedded" can be replaced by "on" or "on top of" or "within" or "below". One or more signal emitters can be arranged or disposed or placed on and/or on top of and/or within and/or below of the surface (e.g. textile embodiment). In some embodiments, at least one emitter can be operatively coupled with the surface (for example a signal emitter can be disposed in/on the wall of a room comprising the waveguide surface).

In an embodiment, the receiver comprises a surface coupling device configured to receive the electromagnetic signal emitted by the signal emitters.

In some embodiments (e.g. one emitter, plurality of receivers), the verb "to receive" can be substituted by the verb "to emit".

In some embodiments, the coupling can be contactless (i.e. local modification or perturbation of the underlying electromagnetical field). In an embodiment, a coaxial probe for example may be used. In some embodiments, the coupling can be made with electrical contact, for example with a conductive wire (e.g. a shoe lace) sliding on the floor (for continuous contact) or with an electrical part (e.g. inserted in or under a heel of a shoe) for intermittent contact.

In one embodiment, the position of the receiver is determined by one or more of multilateration and/or trilateration and/or triangulation and/or received signal strength indication and/or fingerprinting and/or angle of arrival and/or time of flight.

In some embodiments (e.g. one emitter, plurality of receivers), the noun "receiver" can be replaced by the noun "emitter".

In an embodiment, the location of object/receiver with respect to base stations can be determined by multilateration (hyperbolic navigation or "TDOA") and/or trilateration and/or triangulation and/or Received Signal Strength Indication (RSSI) and/or fingerprinting and/or Angle of Arrival (AoA) and/or Time of Flight (ToF) based techniques.

Multilateration can be based on the measurement of the difference in distance to two base stations at known locations by broadcast signals at known times. Measuring the difference in distance between two stations can enable to determine possible locations plotting a hyperbolic curve. To determine the exact location along that curve, multilateration relies on multiple measurements: a second measurement taken to a different pair of stations will produce a second curve, which intersects with the first. When the two curves are compared, a small number of possible locations are revealed, producing a "fix". Advantageously with multilateration, there is no need for a common clock. In addition or in substitution, trilateration can be used. Trilateration uses distances or absolute measurements of time-of-flight from three or more sites. In geometry, trilateration is the process of determining absolute or relative locations of points by measurement of distances, using the geometry of circles, spheres or triangles. In addition or in substitution, triangulation can be used. Triangulation uses the measurement of absolute angles (the location of a point is determined by forming triangles to it from known points). Triangulateration designates a combination of triangulation and trilateration.

In an embodiment, the receiver is locally associated with a GNSS receiver, wherein the receiver is further configured to encode and to emit the geolocation determined by the GNSS receiver via electromagnetic signal through the surface waveguide.

In an embodiment, the receiver is "locally associated" with a receiver (for it is physically attached to a GNSS receiver e.g. worn by the user or placed next to the shoe as a releasable extension).

The GNSS receiver can be configured to determine signal-to-noise ratio and pseudo-range. The GNSS receiver determines a user position, velocity, and precise time ("PVT") by processing signals broadcasted by satellites. The GNSS component can obtain SNR (for Signal to Noise Ratio) and pseudo range. The GNSS location, if acquired and once emitted, can be used to improve accuracy of the locations of other objects. In other words, cooperating devices can comprise GNSS enabled devices.

Processing and/or storage means (to encode, process and store satellite signals) can be local (e.g. local memories or associated to an embedded computer) and/or remotely accessed (Cloud computing e.g. a server configured to compute positions and associated with base stations, and/or external devices e.g. located nearby).

In an embodiment, emitting base stations can transmit GNSS like signals into/within the surface.

In an embodiment, the system further comprises a clock accessible to the receiver and at least one signal emitter.

In some embodiments, depending on the type of measurement, a reference or synchronization clock may be required (for example for Time of Arrival TOA or Time Difference of Arrival TDOA positioning) or advantageously used (if optional). In some embodiments, one single clock can be shared, as data communication can allow to share and access such a clock among cooperating devices (the receiver and one or more of the base stations). In some embodiments, a clock is not required (i.e. for positioning techniques which are not time-dependent). In an embodiment, scheduling such as round-robin can be used (time slices or time quanta can be predefined, e.g. with associated priority of emissions). Other mechanisms can include voting mechanisms, distributed consensus in distributed systems, as well as variants of round-robin scheduling (weighted round-robin, deficit round-robin, multilevel queue, etc).

In an embodiment, the surface waveguide is placed on a support surface, said support surface being one or more of a ground floor, a sidewalk, a street, a transportation platform, a road lane, a bus lane or an airport landing lane.

In an embodiment, the system further comprises one or more signal or electromagnetic wave absorbers.

In some embodiments, the surface can be associated with electromagnetic absorbers.

Radio-waves can be at least partially absorbed (trapped, attenuated). Electromagnetic absorbers may comprise a specifically chosen or designed material to inhibit or reduce the reflection or transmission of electromagnetic radiation (e.g. dielectrics combined with metal plates spaced at prescribed intervals or wavelengths, with specific absorption frequencies, thickness, component arrangement and configuration of the materials). Resonant absorbers and/or broadband absorbers can be used.

The surface wave absorber can avoid or minimize multipath. "Wave absorbers" can be placed appropriately to minimize multi-path. In particular, absorbers can be place at edges or at corners of a room (global optimization for guiding waves). In an embodiment, wave absorbers and guides are tightly intermingled (local optimization for guiding waves)

In some embodiments, for example in combination with wave absorbers, wave junctions or bridges can be placed appropriately in the system to extend the surface allowing the determination of location (bridge from one room to another).

In an embodiment, the surface further comprises a protective layer.

Optionally, one or more protective layers can be added, to protect the combination of described conductive layers. Such protections allow outdoor uses. Protective layers for example may be transparent, and/or colored. Protective layers may comprise solar cells.

In an embodiment, at least one emitter is unidirectional.

In an embodiment, the surface coupling device uses contactless coupling.

In an embodiment, the surface coupling device is inserted or otherwise embedded in a shoe or in a tire of a vehicle.

In an embodiment, the system further comprises a computer configured to process locations of a plurality of objects determined over time.

The fleet of cooperating devices, in a peer-to-peer (distributed model) implementation and/or in a centralized implementation, can produce a significant amount of data and may require additional computing capabilities.

FIG. 1 shows an embodiment of the invention.

FIG. 1 shows "base stations" or "signal emitters" or "access points" (111, 112 and 113) disposed on and/or within the surface 121 (for example disposed in a room 122). The surface may comprise 1D (one dimensional, e.g. a wire) and/or 2D waveguides. One or more base stations emit electromagnetic (radio) waves. An object 101 associated with a receiver 102 is located/positioned on the surface 121 (for example a shoe of a user). The distance between the object 101/102 and the different base stations (for example 112) can be determined in different manners.

The figure also shows that the surface 121 may be connected to a plurality of other surfaces, e.g. surface 199 (located in another room). The connection may be made using a wire 198 between rooms, for example.

In an embodiment, the "surface" or circuit board 121 comprises waveguides.

Waveguides may be 2D (two dimensional) or comprise 2D areas. Waveguides also may be 1D (one dimension, e.g. a wire). Surfaces can be interconnected, for example via wires between rooms.

Within a same room, a surface may comprise 1D and/or 2D waveguides. In a plurality of rooms of a building, surfaces may be interconnected, logically (regarding the positioning) and/or physically (e.g. by electromagnetic bridges or wires interconnecting the plurality of surfaces and/or rooms). Complex interconnections schemes may be used; for example a part of a surface of a first room can be interconnected with a part of another surface in a second room.

In a particular embodiment, three base stations are used. One or more base stations may be incorporated in AC power plugs and sockets (e.g. "power plug", "electric plug", "plug top", "power point", "plug socket", "wall socket", "wall plug" etc).

In an embodiment, two base stations are used (measurements are then repeated over time and positioning can be determined by augmented methods).

In an embodiment, one single base station is used (electromagnetic signal EM in the floor), combined with two other signals in 3D (i.e. elevation, height). According to such an embodiment, the receiver may then use two different modules (for example the one provided in a shoe and another part located for example in a smartphone).

In an embodiment, one emitter and any number of receivers is used. Each receiver allows determining its distance to the emitter: by gathering three distances, an external logic may determine the position of each receiver (the emitter is at the intersection of three circles of radius equal to the respective distances). According to such an embodiment, a room may require minimal instrumentation. In some other embodiments, two signal emitters are used complemented by an external source of information.

In an embodiment, one emitter and one or two receivers are used. Each receiver allows determining its distance to the emitter. By gathering one or two distances, an external logic may determine the position of each receiver combining other information (e.g. one receiver is located at a corner). According to such an embodiment, a room may advantageously require installation of reduced instrumentation.

In an embodiment, a "peer-to-peer" system is implemented: both the role of emitter and of receiver is endorsed by a same object. For example, the object 101 may be an emitter/receiver inserted in the heel of a shoe worn by a user located in a room. In the presence of a plurality of users equipped with such objects in the same room, peer-to-peer negotiations may be handled (with or without the presence of a centralized intelligence or logic circuit). The fleet may be heterogeneous (some objects can be emitter/receiver, while some other may only comprise receivers. In some embodiments, some emitters have a fixed position, for example inserted in the ground, while some others are moveable. Such embodiments advantageously reduce the instrumentation required to operate the global positioning system to a minimal level; for example, shoes (modified to incorporate the invention) of users walking on a carpet (modified to incorporate the invention) may be sufficient to enable indoor location.

Embodiments of the invention may be combined with existing positioning systems including machine vision, RFID tags, inertial systems, wireless communications, etc. For example, the positioning or locations of persons or objects without any instrumentation according to the invention can be nevertheless indirectly located or positioned, if reference points incorporating the invention can be tracked. For example, a child can be located if accompanying a parent wearing a shoe incorporating the invention and if a Bluetooth™ connection between devices worn by parent and child is present to establish relative positioning. In other words, the prior knowledge of the geometry between objects or persons helps the deduction of positions, along measures performed according to other techniques.

In some embodiments, persons or objects with instrumentation (according to the invention) which are intermittently connected are indirectly located, for example by combining information from other techniques as stated previously (e.g. via contactless network such as short distance/range communication network or the like) and/or by processing the history of previous connections and/or by using more complex data computations and or prediction algorithms (anticipated movements, etc.).

In an embodiment of a peer-to-peer implementation, a shared clock may be used. Emitter and/or receiver roles can be exchanged, for example given an imposed external heartbeat, or according to other temporal schemes. Such embodiments advantageously allow avoiding the need of any privileged role and thus diminish possible weakness of the network (e.g. if a node is rendered unavailable). In an embodiment, the shared clock is organized and/or distributed by the surface itself. In an embodiment, scheduling such as round-robin may be used (time slices or time quanta can be predefined, e.g. with associated priority of emissions). Other mechanisms may potentially include voting mechanisms, distributed consensus in distributed systems, as well as variants of round-robin scheduling (weighted round robin, deficit round robin, multilevel queue, etc).

Figure 2:
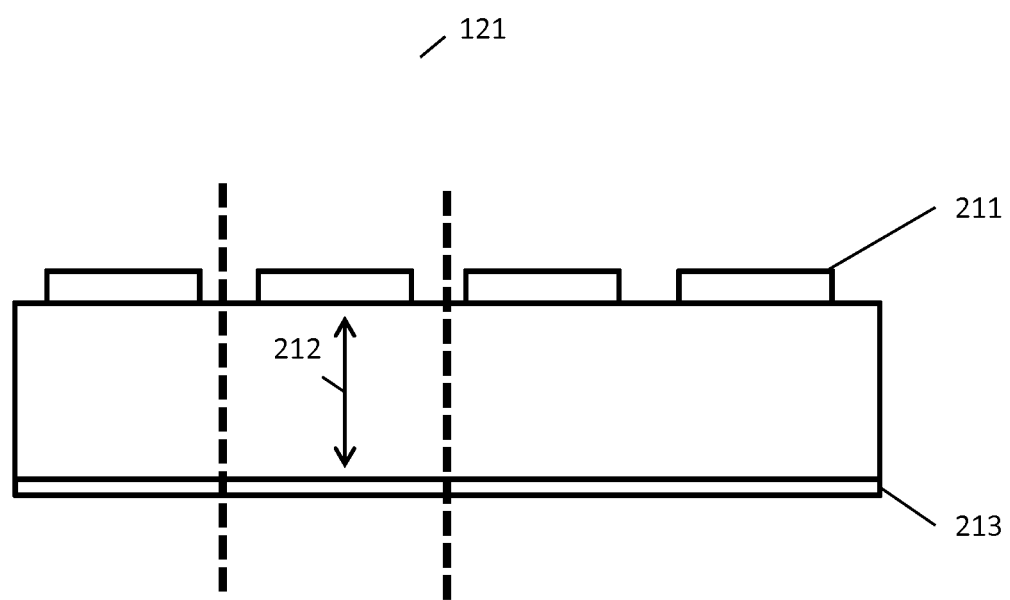
FIG. 2 illustrates various embodiments of the surface waveguide.

FIG. 2 illustrates various embodiments of the surface waveguide.

Here is disclosed a surface waveguide configured to guide electromagnetic signals emitted from one or more emitters and further configured to be coupled with one or more receivers placed on said surface waveguide, the position of a receiver being determinable by signal processing.

In an embodiment, the surface waveguide comprises one or more one-dimensional wire waveguides.

In an embodiment, the surface waveguide comprises one or more two-dimensional (2D) waveguides.

In an embodiment, a two-dimensional waveguide comprises conductive elements.

The surface waveguide may advantageously be at least partially coated with a dielectric material (better conductivity and signal capture).

In an embodiment, the surface waveguide can further comprise an electrical mass layer.

In an embodiment, the surface waveguide further comprises one or more vias connecting one or more conductive elements and the electrical mass layer (improving the guide).

In an embodiment, the surface waveguide comprises two frequency-selective layers respectively supporting transverse-magnetic and transverse-electric modes with a same phase velocity.

In an embodiment, the first layer comprises gaps in one first direction and the second layer comprises continuous conducting strips in a second orthogonal direction.

In an embodiment, the conductive elements are arranged in patterns (improved or different guidance of waves).

In an embodiment, patterns form a lattice or treillis.

In an embodiment, patterns are irregular patterns and the surface waveguide is anisotropic.

In an embodiment, conductive elements are painted and/or sprayed and/or burned and/or deposited and/or coated and/or sewed and/or printed onto a support surface.

In an embodiment, the support surface is one or more of a ground floor, a sidewalk, a street, a transportation platform, a road lane, a bus lane or an airport landing lane.

In an embodiment, the position of a receiver is determinable by one or more of multilateration and/or trilateration and/or triangulation and/or received signal strength indication and/or fingerprinting and/or angle of arrival and/or time of flight.

Here is disclosed a multi-layered surface comprising a plurality of surface waveguides according to any one of the preceding embodiments, wherein each surface waveguide can be associated with a distinct emitter (for example associated with different frequencies) and wherein each surface waveguide is configured to be coupled with a same receiver (concurrent positioning system).

The surface (waveguide) manipulated according to the invention can be made (e.g. assembled, manufactured) in different manners. In one embodiment, the surface comprises or be made of 1D (one-dimensional) conductive wires, in a mesh or a grid (regular or irregular). In one embodiment, the surface comprises or is made of two dimensions (2D) waveguides. Two dimensional (2D)

embodiments can be increasingly sophisticated. In a variant, only conductive elements 211 may be required (i.e. parts 212 and 213 of the example are not used). Conductive elements may be metallic. The shapes and arrangement of conductive elements can be diverse, and can influence, more precisely guide the propagation of electromagnetic waves. Such metallic elements can be disposed on-site and/or off-site. They can be painted (e.g. sprayed through a mask or without) and/or burned (PCB boards, possibly flexible electronics) and/or deposited and/or coated and/or sewed and/or inserted and/or printed into/onto a preexisting and/or specific support surface. Chemical reactions and/or mechanical processes may be used.

The preexisting surface—onto which conductive elements can be arranged—may be the native ground (e.g. the floor of a room, the asphalt of a road) and/or a preexisting support surface (a carpet for example).

In a variant, conductive elements 211 may be arranged on top of, and/or below, and/or within a dedicated layer 213 (acting as an electrical mass, thereby improving the 2D confinement of the electromagnetical signal propagating in the surface). The layer 213 can be one or more of a carpet, a ground sheet, a coat, an envelope, a film, a layer, a sheet, a blanket, a layer, a mask, a screen, etc. In some embodiments, metallic elements 211 can be placed above the bottom layer 213. In some embodiments, conductive (e.g. metallic) elements 211 can be placed under the bottom layer 213. In some embodiments, parts of elements 211 can be placed above and parts can be placed under the bottom layer 213.

In an embodiment, the surface 212 comprises conductive e.g. metallic elements 211 (e.g. circuit board substrate) and a layer 213 (e.g. a polyimide layer). Circuit boards can be pressed together, separated by layers of polyimide, which can form the insulator for the capacitors.

In an embodiment, the layer 213 can be for example a carpet to which conductive elements 211 are attached during manufacturing (such a specific "instrumented" carpet can be packaged in rolls and be further installed, cut and optionally glued in room(s) of a building). In another embodiment, the layer 213 can be a layer of paint, onto which conductive elements can be further sprayed (a protective film can be later disposed to prevent scratches and damages). In one embodiment, conductive elements can be part of the paint itself. In an embodiment, the layer 213 is the asphalt of a road and conductive elements are mechanically inserted. In a variant, conductive elements are sprayed onto the road, being optionally further protected by a deposit for protection (e.g. glass layer).

In a variant, in addition to conductive elements 211 and to the electrical mass 213, a plurality of vias 212 can be arranged. Conductive elements, for example formed as metal patches and placed at the top, can be connected to the bottom layer 213 by metal plated vias or vice-versa. Metal plated vias can allow vertical connections between horizontal traces made by conductive elements on the surface. In some embodiments, the system comprises vertical conducting vias, for example if very high impedance values are needed, or to completely block surface waves.

Advantageously such an arrangement (with boundary condition) forbids some frequency band(s). By engineering the surface, e.g. with a specific texture on a conducting surface, it is possible to modify and/or influence its radio-frequency electromagnetic properties. In the case where the period of the surface texture is significantly smaller than the wavelength, the structure can be characterized by one parameter: the surface impedance.

In an article entitled "ELIMINATING SURFACE CURRENTS WITH METALLO DIELECTRIC PHOTONIC CRYSTALS" published in 1998 IEEE MTT-S Digest by Sievenpiper, it has been shown that some types of metallic-dielectric photonic crystal can act as an engineerable artificial metal which can completely expel electromagnetic wave (i.e. forbid the propagation of electromagnetic radiation through their bulk) and support surface currents. By engineering the geometry of the surface, in particular by arranging metallic islands incorporated into the dielectric lattice, it can be built a band gap (i.e. over a certain frequency range) for the surface currents which overlaps the bulk band gap (but without the unwanted surface waves), providing ground planes for antenna applications. The effect can be achieved with only a thin skin of photonic crystal structure arranged above a regular metal surface.

In such an arrangement, surface waves may occur on the interface between two dissimilar materials, such as metal and free space. Electromagnetic waves may be bound to the interface, and may decay exponentially into the surrounding materials.

By appropriately configuring the arrangement of conductive elements 211, substrate layer 213 and vias 212, electromagnetic signal can be precisely controlled, therefore enabling advantageous uses for indoor positioning.

In an embodiment, the geometry of the surface used by the system according to the invention comprises a corrugated metal surface in which corrugations can be folded up into lumped-circuit elements, and distributed in a lattice. In some embodiments, its periodicity may be advantageously significantly inferior to the free-space wavelength.

In an embodiment, the geometry of the surface used by the system according to the invention comprises a metal sheet covered with small bumps, or a corrugated metal slab. Bumpy surfaces can be used. Surface waves can consequently be advantageously eliminated from a metal surface over a finite frequency band by applying a periodic texture, such as a lattice of small bumps. In an embodiment, a corrugated surface is or comprises a metal slab, into which a series of vertical slots can be cut. In an embodiment, the slots are narrow, so that many of them can fit within one wavelength across the slab. In an embodiment, the surface can be periodic two- or three-dimensional dielectric metallic, or metallic-dielectric structures.

In some embodiments, the conductive patch or conductive grid 211 may comprise one or more of copper, gold, conductive ink or paint. The dielectric substrate 212 may comprise one or more of wood, lino, paper, non-conductive paint. The conductive layer 213 may comprise metallic patches, be made of conductive paint. The surface may comprise one or a plurality of such layers.

Other geometries or textured surfaces are possible. Some geometry of specific surface waveguides can support both TM (transverse-magnetic) mode and TE (transverse-electric) mode with the same phase velocity. A first type of surface-wave waveguide may be composed of two frequency-selective surfaces (layers with TM mode and TE mode). Such frequency-selective surfaces may be loop-type or wire-grid-type. A second type of surface-wave waveguide also may comprise at least two layers (a top layer comprising gaps in one first direction and continuous conducting strips in the second orthogonal direction).

Regarding topology, a frequency-selective surface may comprise a plurality of unit-cells. Unit-cell geometries dominant modes can be TE mode (e.g. square patch, square loop, or Jerusalem cross structure). The gaps between adjacent conducting patches or wires can advantageously create a dominant capacitive response at low frequencies. Unit-cell geometries with dominant TM mode can comprise a wire grid and/or a ring slot structure (their surface impedances are inductive).

In an embodiment, the top layer may comprise square loops while the bottom layer may comprise a wire grid. Physical dimensions of a loop-wire unit cell geometry can be for example in the range of 3.5 mm for the side of the square/grid, the layers being placed at 0.5 mm from each other and the width of the loops/wires can range from 0.225 mm to 0.25 mm.

In an embodiment, the bi-layer may comprise more complex arrangement (with shapes such as bow-tie or hexagonal units).

In complex embodiments, the geometry can vary in space (i.e. irregular cell units). In the article *"Patterning Technique for Generating Arbitrary Anisotropic Impedance Surfaces"* by Jaydon Lee and Daniel F. Sievenpiper, IEEE 2016, several patterning approaches have been shown to determine a range of cell sizes, shapes, and orientations, including smoothly varying and highly anisotropic impedance surfaces. Anisotropic impedance surfaces may thus be used, in particular to control surface waves, scattering, conformal antennas and waveguides. Their electromagnetic properties can be defined by the thickness of the substrate, and the capacitance between patches, which together determine the effective surface impedance. Varying the cell size and shape allows the impedance to be controlled.

Anisotropic surfaces can include square and/or circular patches with slices rotated to an arbitrary angle, and/or other patterns confined to a square lattice, as well as lower symmetry cells that cannot be arranged into arbitrary patterns. A plurality of patterns can be obtained (varying cell shape, gradient of impedance, varying orientation, etc).

Further geometry and patterns are described.

In an embodiment, the surface is plane.

In an embodiment, the surface is substantially (locally) plane, i.e. close enough to flat so that the associated error is minimal. Such embodiments allow indoor positioning (e.g. apartments, offices, commercial centers, etc), wherein the thickness of the 2D waveguide can be sufficiently controlled.

In some embodiments, the thickness of the 2D waveguide may vary. A map of the geometry of the coated/distributed waveguide can then be determined/calibrated and further taken into account.

In some embodiments, a plurality of waveguides can be used, possibly of different geometries. The geometry of a waveguide may vary. A waveguide according to the invention can be a 1D or a 2D waveguide (i.e. in two dimensions). A 2D waveguide can be distributed in space (i.e. a coating), but a grid of waveguides is also envisioned.

The geometry of a waveguide may comprise one or more shapes and/or one or more patterns.

Shapes can be one or more of round, square, rectangular, butterfly-shaped, spirals (two-dimensional, Archimedean, Cornu, Fermat's, hyperbolic, logarithmic, Fibonacci, etc).

Patterns may be symmetrical or asymmetrical. Patterns may comprise one or more of a tree, a fractal structure (e.g. to increase contact surfaces), a spiral, a flow, a 30 meander, a wave, a dunes, a bubble, foam, a crack, a spot, a stripe, a grid or a combination thereof (of the preceding geometries). Patterns may comprise tessellations (patterns formed by repeating tiles all over a surface). Groups of tilings may include wax cells (such as those in honeycomb). Tiles may be overlapping. Patterns may use regularly repeating three-dimensional arrays (e.g. crystal structure, Bravais lattices). Other forms or geometries may include but are not limited to arrays, tilings, pavements, reticulate structures, etc. Textile patterns are also possible (e.g. end-on-end, pin stripes, rain pattern, toile, etc). Surfaces may comprise one or more of a minimal surface, a ruled surface, a non-orientable surface, a quadric, a pseudo-spherical surface or an algebraic surface. Some patterns can be controllable (e.g. configurable at start or dynamically, evolve over time, etc).

In an embodiment, the surface comprises repeated patterns (or periodic structures).

Advantageously, patters and/or periodic structures are the smallest as possible, preferably smaller than half a wavelength. In some embodiments, patterns/motifs can be smaller than 10% of the surface coupling device.

The selection of the wavelength of the signal emitted by signal emitters depends on multiple parameters. In an embodiment, the wavelength may be a first order function of the precision required by the envisioned use of the system (e.g. storage warehouse with demanding accuracy requirements). The wavelength can also depend on safety regulations (yet it can be possible to minimize the radiated field existing above the surface).

Dimensions of the lattice advantageously allow slowing down the propagation time of the electromagnetic waves and/or to increase accuracy/precision. In an embodiment, the accuracy of an envisioned use of the described system is taken as an input so as to influence the propagation speed of the electromagnetic waves, and to further determine or constrain the dimensions or geometry of the waveguide surfaces (or waveguides in/within the surface).

In an embodiment, a plurality of frequencies are used, advantageously eliminating or minimizing errors.

In an embodiment, the conductive layer comprises a plurality of sub-layers. The conductive layer may comprise a plurality of islets or "islands" (disconnected areas) of conductive layers may be bound together (logically by software) and/or physically by strips, bridges, etc. . . .

Patterns or periodic structures may comprise one or more or a grid and/or a mesh and/or a treillis and/or lattice.

In some embodiments, the surface comprising waveguides is permanent and in some others it is temporary (e.g. removable conductive grid).

In an embodiment, the surface is multi-layered, advantageously allowing addressing multiple base stations in parallel.

In some embodiments, the surface is partitioned in different parts, each part having different properties (e.g. different "resolution" with respect to positioning).

One or more waveguides (assembly of conductive elements and/or mass layer and/or vias) manipulated by the invention may be painted and/or coated and/or sewed and/or deposited, in or onto a support surface (preexisting, dedicated, modified, etc).

In an embodiment, waveguides are coated. Electromagnetic waves can propagate into a specific matter (e.g. a "metasurface" or surface coated with a dielectric). In an embodiment, the surface is at least partially coated with a dielectric material of known properties. In an embodiment, the surface comprises a substrate of polyvinyl chloride or vinyl ("linoleum") or a carpet which may be coated with a dielectric layer.

In an embodiment, waveguides are printed. Capacitively coupled structures can be obtained by using printed circuit board technology. Circuit boards can be stacked and bonded together to form 3-D periodic structures.

In an embodiment, waveguides are assembled. In an embodiment, facing metallic elements are separated by dielectric layers. The substrate for example can be microwave circuit board dielectric material. Layers of polyimide may be separate circuit boards. Metal patches on each adjacent board may be aligned to form a metal/polyimide/metal capacitor. Bounds can be obtained under pressure with adhesive (e.g. phenolic butyral).

In an embodiment, waveguides are painted (e.g. sprayed). In some embodiments, the surface are sprayed with conductive materials. For example, roads or sidewalks can be painted and/or coated with conductive materials forming a 2D waveguide (the thickness can be controllable, or not).

In an embodiment, a 2D waveguide can be, in combination, coated and/or painted and/or sprayed and/or sewed and/or otherwise deposited on existing surfaces (e.g. sidewalks, etc).

Advantageously, in some embodiments, the ground floor may not require to be modified: additional conductive layers can be provided. For example the ground floor of a conference center can be painted, sprayed or otherwise coated or deposited conductive layer (e.g. ink printing or ink deposit with conductive particles).

In some embodiments, the waveguides are sewed (i.e. natively, e.g. in a specific carpet). For example, the surface can use weaving (or knitting or felting or braiding or plaiting), at least in part (combination of sets of yarns or threads can be interlaced to form a textile surface).

Figure 3:
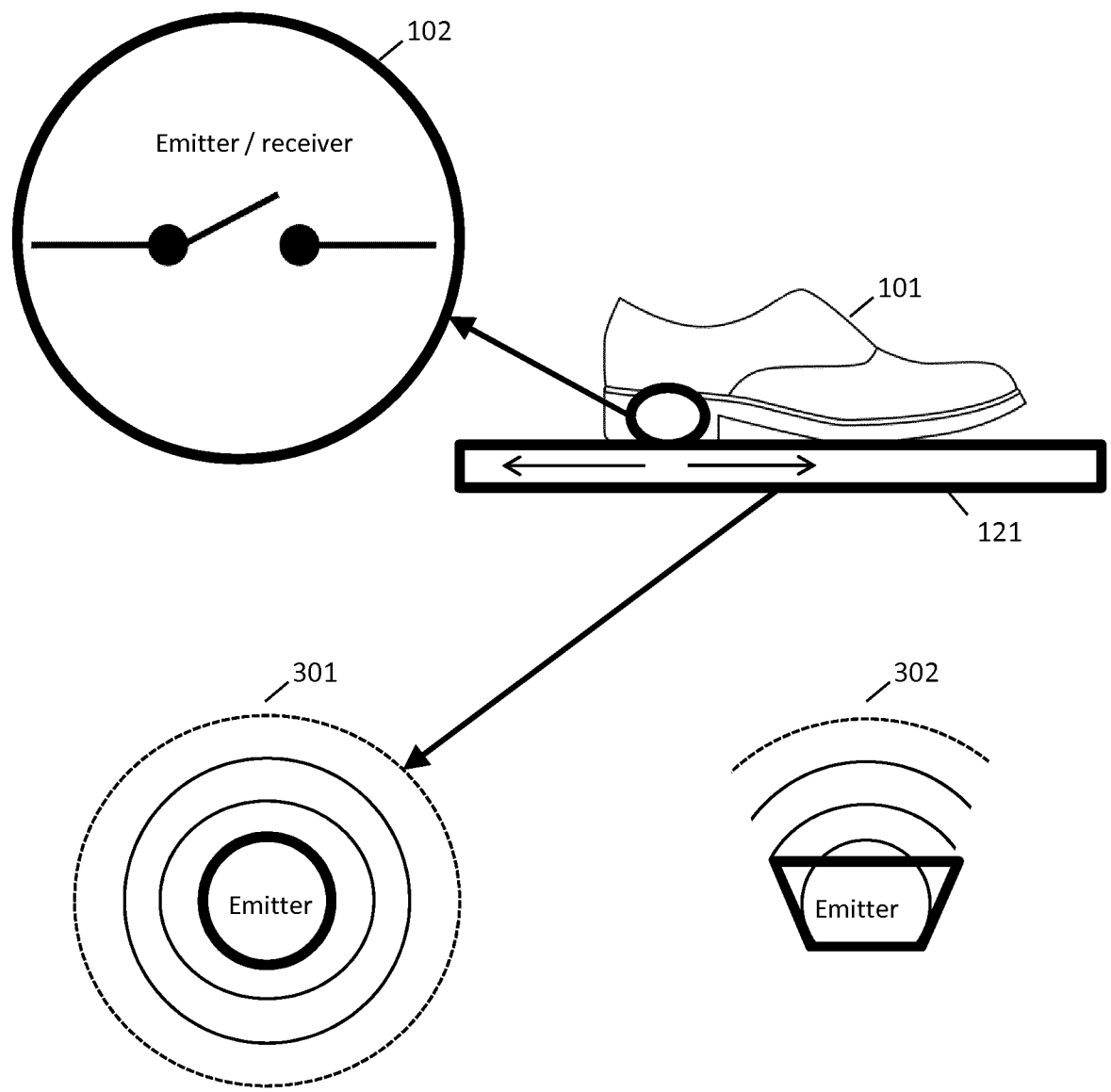
FIG. 3 illustrates various embodiments of signal emitters and surface coupling devices.

FIG. 3 illustrates examples of embodiments of signal emitters and surface coupling devices.

FIG. 3 shows an embodiment exemplifying variants of signal emitters (or base stations) and/or of surfaces and/or coupling devices or mechanisms.

The figure comprises an object 101 (e.g. a shoe or a tire) associated with a receiver, the receiver being associated with a surface coupling device 102. The surface coupling device may then acquire the signal propagating in the surface 121, as emitted by a plurality of base stations (301, 302).

The electromagnetic signal may be modified both by signal emitters (which may be omnidirectional or isotropic but which also can be directional) and/or by the surface (specific embodiments of waveguides can guide the signal in a specific manner).

In one example, the base station 301 is omni-directional (isotropy of emission). Such a base station can be hidden in the middle of a monitored room, for example.

In another example, the base station 302 is directional. Such a base station may be placed in a corner of a room.

In other embodiments, the structure of the surface can influence the propagation of the electromagnetic signal. For example, anisotropic surface-wave waveguides may advantageously be used.

Variants of surface coupling devices are now described.

In an embodiment, the object/receiver 101/102 comprises a "surface coupling device" or "coupler" or "connector". Such a device can establish operational/operative electrical (i.e. electromagnetic) contact/coupling between the receiver 102 or base stations (111, 112 and 113) and the surface/2D waveguide 121.

Various embodiments are possible for such a surface coupling device. Different types of coupling are possible. Electrical conduction can be used (e.g. by hard-wire, resistive or natural conductor). Electromagnetic induction can be used (e.g. inductive coupling, magnetic coupling, capacitive coupling, evanescent wave coupling).

A surface coupling can be achieved by a wire, resistor, or common terminal, such as a binding post or metallic bonding.

A vertical (respectively horizontal) monopole probe antenna can be used: probes can couple to the vertical (respectively horizontal) electric field of surface waves.

Different coupling mechanisms may be used. Mechanical mechanisms involving springs or other parts can optimize the surface and/or duration of contact. For example, a shoe may comprise a deformable contact surface, which provides the advantage to increase the reliability of the electrical/electromagnetic contact. In such embodiments, the coupling mechanism may contact a convex shape.

In some embodiments, the surface coupling device is embedded in one or more parts of one (or two) shoe(s) of a user (modified shoes). For example, the surface coupling device's parts may be distributed in one or more of the heelcap, the heel, the toe cap, the vamp, the welt, the top piece, etc (even shoelaces, which can intentionally remain in contact with the ground). The welt and/or the heel may comprise conductive elements in contact with the ground.

In some embodiments, the surface coupling device is configured to be associated to (attachable to) a standard shoe. For example, the surface coupling mechanism may be inserted into a hole drilled in the heel. In some cases, no modification of a shoe is even required, as the surface coupling device can be linked (releasable attachment or not) to one or more shoe.

Other embodiments are directed towards wheels or tires of transportation vehicles (for example a tire may comprise conductive wires or parts which come in contact with the ground, at least from time to time). The sequence of contacts, knowing the geometry of the surface coupling device, also can lead to the evaluation of displacement speed (e.g. by calibration). In some embodiments, the contact between the surface and the surface coupling device is permanent. In some other embodiments, the contact is intermittent or periodic.

Changes in durations and/or positions allow further determining particular events, such as a person or an object falling on the ground or a flood.

In some embodiments, the surface coupling device is coupled with the surface without any physical contact ("contactless" mode). For example, electromagnetic induction may be used.

Figure 4:
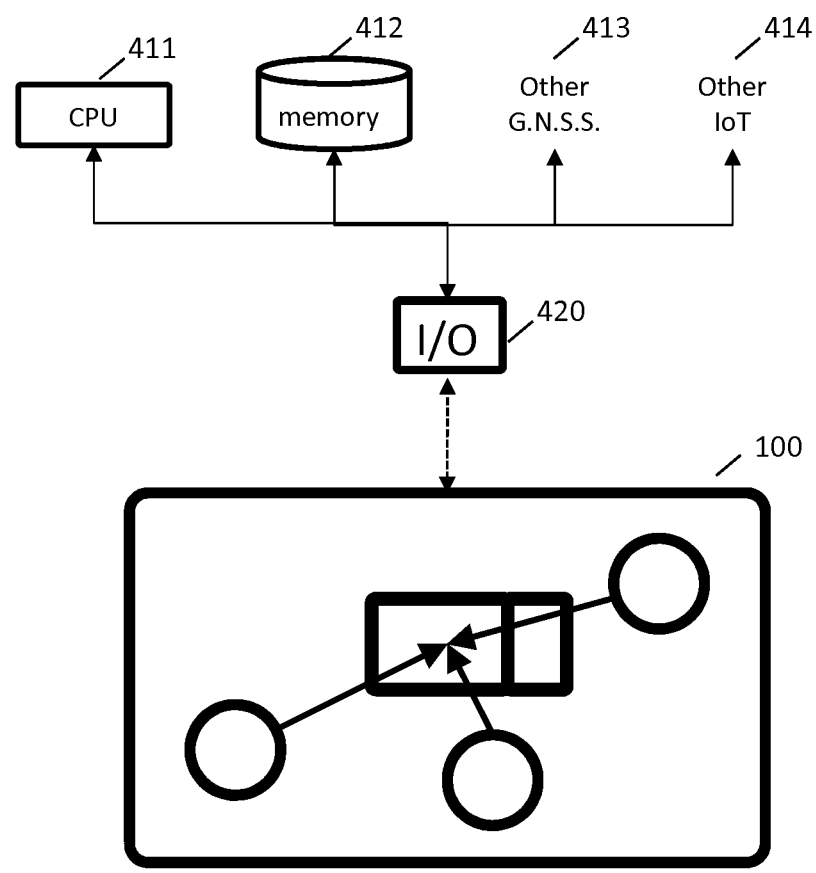
FIG. 4 illustrates some other aspects of the disclosure.

FIG. 4 illustrates some other aspects of the disclosure.

The systems and methods according to the invention may be further "augmented": additional positioning systems can concur to increase the accuracy and/or reliability of the positioning (e.g. outdoor uses can leverage GNSS positioning of cooperating devices available and accessible in the vicinity).

In an embodiment, the position as determined is further communicated to external systems for possible correction.

In an embodiment, the receiver is part of a computer or an IoT device or the like (such as a smartphone, worn by the user). One or more computers may be locally and/or remotely accessed to get or provide computing power 411, as well as memory 412 (e.g. storage).

The object/receiver 100 can communicate (e.g. in a bidirectional manner) via Input/output interfaces (e.g. a smartphone and/or a smart watch) with other systems 413 or 414 (for example providing GNSS signals or PVT, odometer associated with other sensors e.g. inertial, with servers providing floor plans, with Internet of Things devices, etc).

Further embodiments are now described.

Here is described a system for locating an object on a surface waveguide comprising: one, two or three signal emitters with known positions, associated with said surface; the object being associated with a receiver configured to determine its position from signals received from the signal emitters through one or more waveguides embedded in the surface waveguide.

In one embodiment, the system comprises three "signal emitters" (three points are required for triangulation or trilateration). The signal emitters in fact may be of different natures: in some cases, one or even two of these signals emitters ("actively" emitting signal in the surface waveguide according to the invention) can be supplemented or even substituted by other types of devices. In one embodiment indeed, the system comprises two (active) signal emitters, a third emitter being substituted by the provision of "external information" (for example a predetermined geolocation or position can be communicated in a beacon (or device or terminal) which in response to a query provides position information, or which without request broadcasts its position information). For example, the beacon or device or terminal can be or be included in a smartphone, even a moving one (i.e. as worn by a user), which communicates on demand—or otherwise broadcasts—its position. In some embodiments, two of the three position points are associated with such "external" information (two smart phones broadcasting their positions can help positioning a fourth one).

The position from the signals received from the at least three signal emitters may be determined locally and/or remotely (implying communication capabilities in the latter case). In one embodiment, the object comprises a circuit configured to calculate the position of the object from the three received signals (advantageously, this computation can be performed with little or short delay). In one embodiment, the object is associated with a server or otherwise a computer configured to calculate the position from the three signals (the computation can thus also be performed rapidly or even be performed later in time).

In one embodiment, the receiver comprises a surface coupling device configured to receive the electromagnetic signal emitted by the signal emitters.

In one embodiment, the position of the receiver is determined by one or more of multilateration and/or trilateration and/or triangulation and/or received signal strength indication and/or fingerprinting and/or angle of arrival and/or time of flight.

In one embodiment, the receiver is (locally and/or remotely) associated with a GNSS receiver, and the receiver is further configured to encode and/or to emit the geolocation determined by the GNSS receiver via electromagnetic signal through the surface waveguide. Emission can be performed with delay, i.e. later in time.

In one embodiment, the system further comprises a clock accessible to the receiver and at least one signal emitter.

In one embodiment, the surface waveguide is placed on a support surface, said support surface being one or more of a ground floor, a sidewalk, a street, a transportation platform, a road lane, a bus lane or an airport landing lane.

In one embodiment, the system further comprises one or more electromagnetic signals or electromagnetic wave absorbers. In an embodiment, the surface further comprises a protective layer. In one embodiment, at least one signal emitter is unidirectional.

In one embodiment, at least one signal emitters is a smartphone configured to communicate its respective position.

In one embodiment, the surface coupling device uses contactless coupling.

In one embodiment, the surface coupling device is embedded in (or associated with) an object. The surface coupling may be embedded in a material such as plastic, rubber, wood etc. The surface coupling may be embedded or inserted or associated or attached with an object such as a shoe or cloth (during manufacturing or by the user, etc). The object may be a connected device (e.g. Internet of Things device). The object may be the tire of a vehicle.

In one embodiment, the system further comprises (or is associated to/with) a processing unit configured to determine the location of the object (one time, or repeatedly over time). In some embodiments, the position of the object can be monitored over time, i.e. movements can be tracked. The evolution of the positions associated with a given object over time can be compared against predefined scenarios and an event can be determined. For example, modified shoes worn by an elderly person can lead to expect a predefined temporal pattern on the floor. An interruption of such a pattern (or an anomaly thereof) can lead to determine the probability of a fall on the floor (further potentially raising an alarm for disabled or employee working in dangerous area as example). A plurality of objects can be tracked in parallel. On a sidewalk, for example requiring specific surveillance, flows of persons can be monitored and a person walking against the current can be detected. In a warehouse, specific paths of goods can be expected and abnormal routes can be detected.

In one embodiment, the frequency of the emitted signal is selected amongst a range of predefined frequencies associated with the object to be detected. In some embodiments, some a priori knowledge about the object to be detected or tracked may be available. The frequency of the signal can be adjusted to better detect (e.g. more precisely, more reliably) some specific objects in some situations. For example, modified shoes worn by the elderly can be better detected or tracked if using one or more predefined and specific signal frequencies. The one or more frequencies can be tuned (defined) according to the "fingerprint" of the considered object on the floor and/or to the location, or the velocity, etc.

In some other embodiments, the receiver associated to the object is not even required. For example, a frequency of 2.45 GHz can be suitable to detect a flood of a liquid (e.g. water) on the floor. Such an embodiment can be advantageous in a truck, in a secured area, or in a train (for example).

It can be noticed that in some embodiments a precise determination of the position(s) of the object is not required and some examples are more related to the time associated to the event. The determination of such events derived from a collection of positions over time (e.g. a fall of a person, the path followed by a machine in a warehouse) can be enabled by measuring time of flight and/or fluctuation in signal power. Such information, i.e. without position information, can be necessary and sufficient to determine the occurrence of an event in a monitored area.

In one embodiment, the frequency of the emitted signal is variable over time. In some embodiments, the frequency of the signal is configurable. In particular, it can evolve over time, acting as "radar". For example, to detect liquid flooding in a warehouse, certain frequencies can facilitate detection. After initial detection, further frequencies can be used to further refine the detection. Frequencies can also vary according to possible scenarios (objects or persons falling on the floor, along flooding risks, etc.).

In one embodiment, the emitted signal comprises a plurality of signals of different frequencies. In some embodiments, the signal is not limited to mono-frequency: a multi-frequency approach allows efficiently "scanning" the ground, in particular by avoiding or minimizing multipath or signal perturbations (e.g. function of the carrier signal). Advantageously, using a plurality of frequencies can improve the accuracy of positioning and/or its reliability. It also can discriminate between objects, if tracked in parallel.

Here is described a surface waveguide configured to guide electromagnetic signals emitted from one or more emitters, said surface waveguide being further configured to be coupled with one or more receivers associated with said surface waveguide, the position of a receiver being determinable by signal processing.

In one embodiment, the surface waveguide comprises one or more one-dimensional wire waveguides. In one embodiment, the surface waveguide comprises one or more two-dimensional waveguides. In one embodiment, the one or more two-dimensional waveguide comprise conductive elements. In one embodiment, the surface waveguide comprises an electrical mass layer. In one embodiment, the surface waveguide comprises one or more vias connecting one or more conductive elements to/with the electrical mass layer. In one embodiment, the surface waveguide comprises two frequency-selective layers respectively supporting transverse-magnetic and transverse-electric modes (for example with a same phase velocity). In one embodiment, the first layer of surface waveguide comprises gaps in one first direction and the second layer comprising continuous conducting strips in a second (e.g. substantially) orthogonal direction. In one embodiment, the conductive elements are arranged in patterns. In one embodiment, said patterns form a lattice or treillis. In one embodiment, said patterns are irregular patterns and the surface waveguide is anisotropic. In one embodiment, conductive elements are painted and/or sprayed and/or burned and/or deposited and/or coated and/or sewed and/or printed onto a support surface. In one embodiment, the support surface is one or more of a ground floor, a sidewalk, a street, a transportation platform, a road lane, a bus lane or an airport landing lane. In one embodiment, the position of a receiver is determined or determinable by one or more of multilateration and/or trilateration and/or triangulation and/or received signal strength indication and/or fingerprinting and/or angle of arrival and/or time of flight.

Here is described a surface comprising a plurality of surface waveguides according to the preceding paragraphs, wherein each surface waveguide is configured to be associated with a distinct emitter and wherein each surface waveguide is configured to be coupled with a same receiver.

The examples disclosed in this specification are therefore only illustrative of some embodiments of the invention. They do not in any manner limit the scope of said invention which is defined by the appended claims.

The invention claimed is:

1. A system for locating an object, the system comprising:
a surface waveguide including one or more waveguides disposed therein;
at least two emitters with known positions with respect to the surface waveguide and configured to emit signals at a selected frequency, wherein the selected frequency is associated with the object to be detected, wherein:
the signals from the at least two emitters are received by a receiver associated with the object via the one or more waveguides, and
the receiver is configured to determine a receiver position from the signals from the at least two emitters having the frequency associated with the object.

2. The system of claim 1, wherein the receiver comprises a surface coupling device configured to receive the signals emitted by the at least two emitters.

3. The system of claim 1, wherein the position of the receiver is determined by one or more of multilateration and/or trilateration and/or triangulation and/or received signal strength indication and/or fingerprinting and/or angle of arrival and/or time of flight.

4. The system of claim 1, wherein the receiver is associated with a GNSS receiver, wherein the receiver is further configured to encode and/or to emit a geolocation determined by the GNSS receiver via electromagnetic signal through the surface waveguide.

5. The system of claim 1, further comprising a clock accessible to the receiver and at least one signal emitter.

6. The system of claim 1, wherein the surface waveguide is placed on a support surface, said support surface being one or more of a ground floor, a sidewalk, a street, a transportation platform, a road lane, a bus lane or an airport landing lane.

7. The system of claim 1, further comprising one or more electromagnetic signals or electromagnetic wave absorbers.

8. The system of claim 1, wherein at least one signal emitter is unidirectional.

9. The system of claim 1, wherein at least one signal emitter is a smartphone configured to communicate its respective position.

10. The system of claim 2, wherein the surface coupling device uses contactless coupling.

11. The system of claim 2, wherein the surface coupling device is embedded in or associated with an object.

12. The system of claim 1, further comprising or being associated to a processing unit configured to determine the location of the object, possibly over time.

13. The system of claim 1, wherein the selected frequency of the signals emitted is selected amongst a range of pre-defined frequencies associated with the object to be detected.

14. The system of claim 1, wherein the selected frequency of the signals emitted is variable over time.

15. The system of claim 1, wherein the signals emitted comprises a plurality of signals of different frequencies.

16. The system of claim 1, wherein the signals emitted from the at least two emitters have different selected frequencies.

17. The system of claim 1, wherein the signals emitted from the at least two emitters have same selected frequency.

* * * * *